United States Patent

Leising et al.

[15] 3,647,393
[45] Mar. 7, 1972

[54] GAS-GENERATING APPARATUS

[72] Inventors: Maurice B. Leising, Clawson; Herman J. Greif, Jr., Orchard Lake; James R. Kirberg, Walled Lake; Philip J. Willson, Royal Oak, all of Mich.

[73] Assignee: Chrysler Corporation, Highland Park, Mich.

[22] Filed: May 11, 1970

[21] Appl. No.: 36,020

[52] U.S. Cl. ................................. 23/281, 60/39.47, 62/4, 102/39, 149/72, 149/73
[51] Int. Cl. .......................................................... B01j 7/00
[58] Field of Search ................................... 23/281; 60/39.47; 252/67–71; 62/4; 123/183; 102/39; 149/72, 73

[56] References Cited

UNITED STATES PATENTS

| 2,128,576 | 8/1938 | White et al. | 149/72 X |
| 2,423,427 | 7/1947 | Payn et al. | 149/73 |
| 2,779,281 | 1/1957 | Maurice et al. | 102/39 |
| 3,305,319 | 2/1967 | Kowalick et al. | 23/281 |
| 3,515,518 | 6/1970 | Halstead et al. | 23/281 |
| 3,532,358 | 10/1970 | Selwa et al. | 23/281 X |
| 3,532,359 | 10/1970 | Teague et al. | 23/281 X |
| 3,532,360 | 10/1970 | Leising et al. | 23/281 |

*Primary Examiner*—James H. Tayman, Jr.
*Attorney*—Talburtt and Baldwin

[57] ABSTRACT

Gas generator having a folded inflatable bag connected thereto, the generator having a plurality of pockets confining propellant. Electrical ignition devices ignite the propellant in two pockets first to release gas for deploying or partially expanding the folded bag. Propellant filled channels connect the two initially ignited propellant pockets to the remaining pockets for igniting the latter to release gas for inflating the bag to a desired pressure. A sublimable, vaporizable or decomposable powdered material capable of absorbing heat is provided in the device to absorb the heat produced by the burning propellant.

3 Claims, 4 Drawing Figures

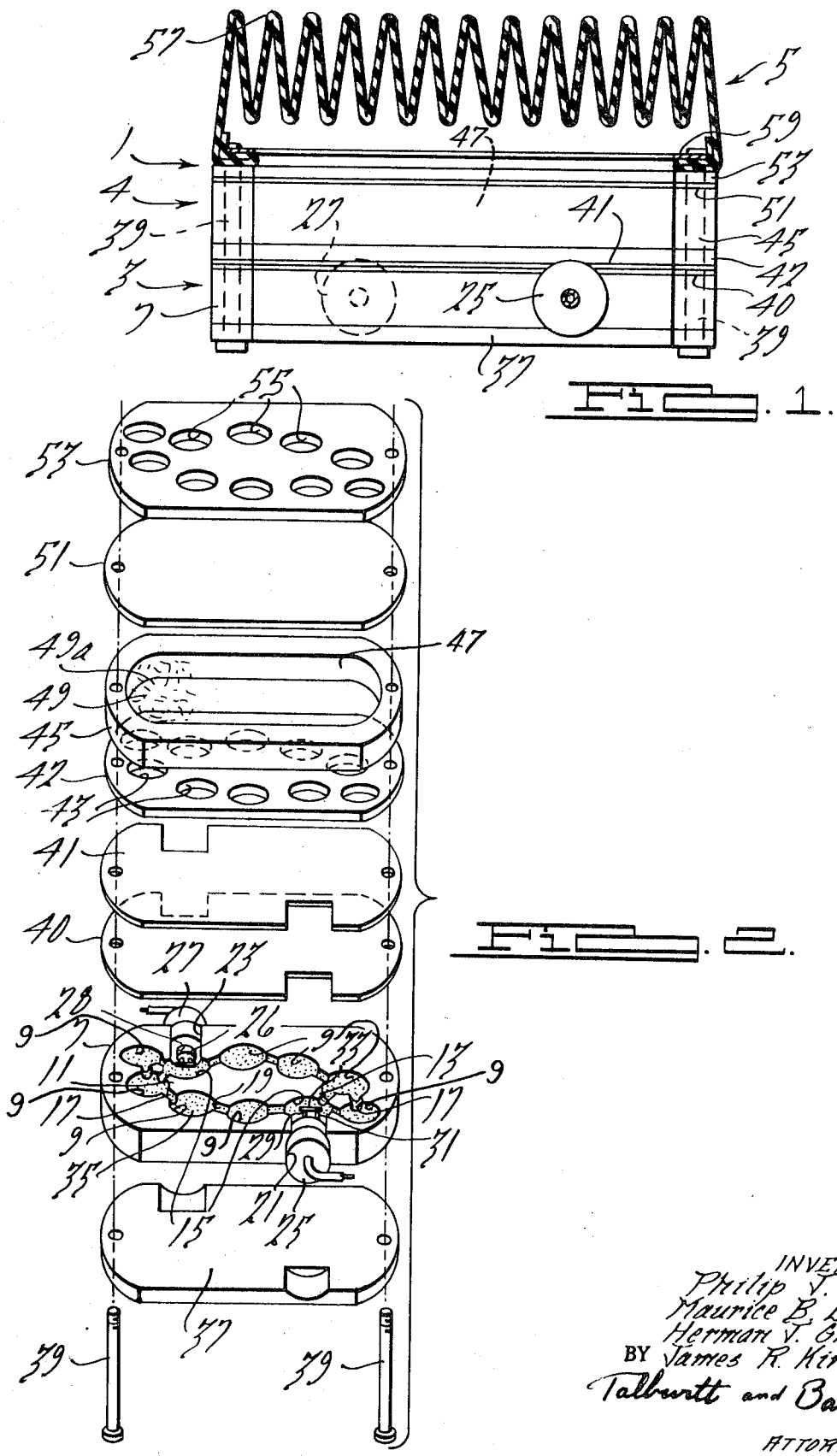

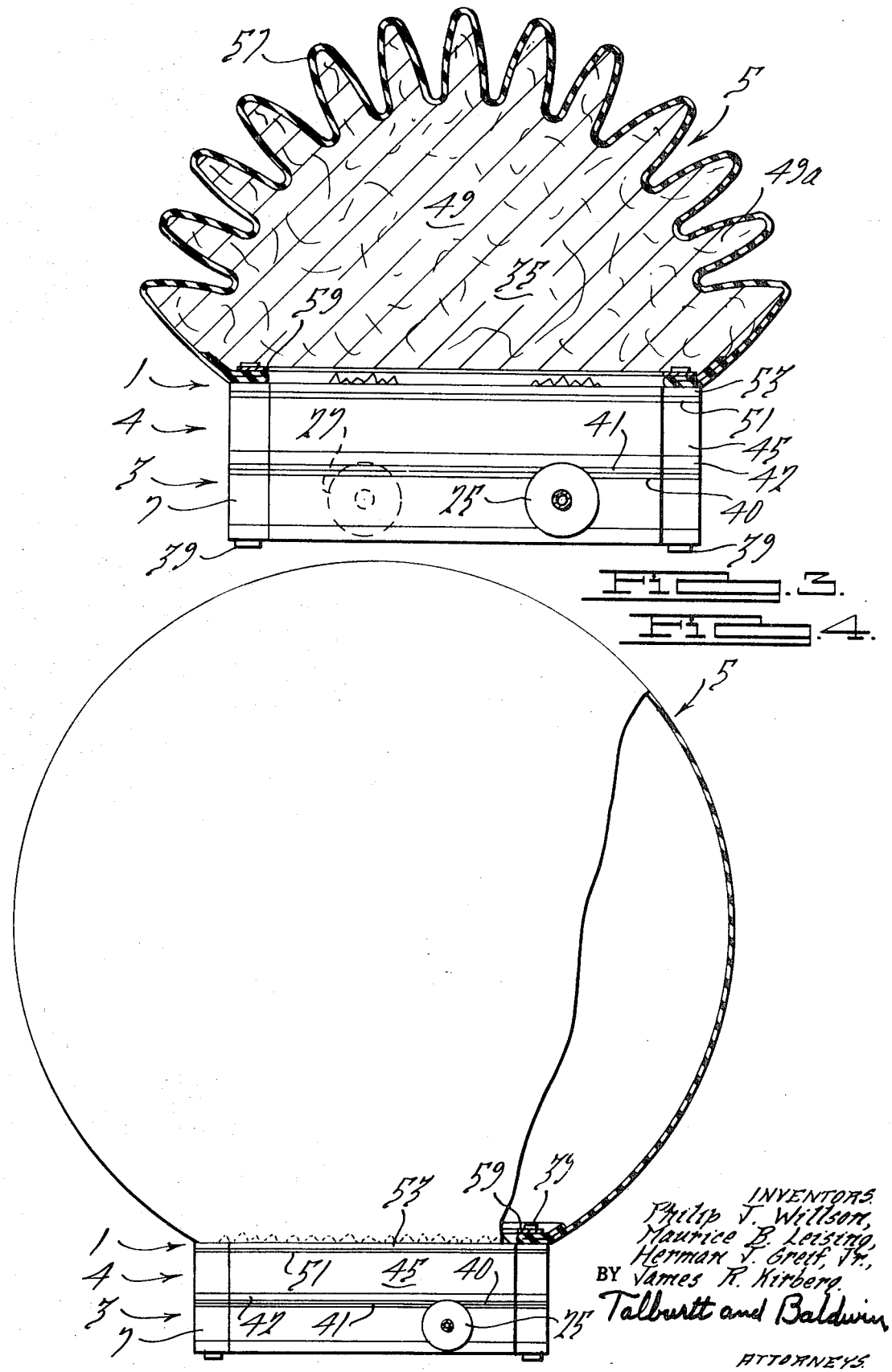

3,647,393

GAS-GENERATING APPARATUS

BACKGROUND OF THE INVENTION

This invention relates to a gas generator and inflatable bag device, and more particularly to such a device particularly adapted for use in automotive vehicles and having improved gas-generating and coolant materials.

Many types of gas source or generator and inflatable bag devices particularly adapted for use in automotive vehicles are known. For example, some of these devices employ a sealed cylinder of compressed gas connected directly or by a conduit to an inflatable bag mounted on the interior of the vehicle. A sensing device is conventionally provided for sensing rapid deceleration or change in velocity of the vehicle. Upon a predetermined change in vehicle velocity, such as upon impact with another object, the sensing device causes a signal to be sent to an actuating device for breaking the seal on cylinder to release the gas to the bag. The latter inflates and provides a cushion against which an occupant may be thrown by the impact.

Many of the known types of devices of this class require rather complicated and large components. The cylinder, for example, containing the compressed gas, is often relatively bulky. Moreover, the bags of these devices could rupture during inflation due to frictional interlocking of one portion of the bag with another portion thereof. Another type of device uses an ignitable propellant to release gas for inflating the bag and a coolant to cool the gases. The present invention is an improvement in the latter type of device.

BRIEF SUMMARY OF THE INVENTION

Briefly, this invention comprises a gas generator for an inflatable bag and the generator having a supply of propellant for expanding the bag, a supply of heat absorbing material to absorb heat from the gases released by the ignited propellant, and a supply of oxidizing material.

One of the primary objects of this invention is to provide a gas generating device which is adapted to fully inflate the bag very rapidly and without heating the same to a very high temperature after a signal requesting inflation is transmitted to the device.

Another object of this invention is to provide a device of the class described which generates the gas at a relatively low pressure and prevents such gas from heating the bag to a high temperature.

A further object of this invention is to provide a device of the type described which permits the gas generator and an inflatable bag to be located in close proximity to one another.

Still another object of this invention is to provide a device such as described which inhibits bag rupture, particularly during initial inflating of the bag from a normally collapsed position.

Another object of this invention is to provide a device of the class described which is relatively compact in construction.

A still further object of this invention is to provide a device of the general type described which is simple and economical in construction and efficient in operation.

Other objects and advantages will become apparent as the description progresses.

BRIEF DESCRIPTION OF THE DRAWINGS

Referring to the drawings, in which one of various possible embodiments of this invention is illustrated, FIG. 1 is a side elevation, certain parts being shown in section, of a device constructed in accordance with this invention;

FIG. 2 is an expanded fragmentary view of FIG. 1;

FIG. 3 is a view generally similar to FIG. 1, showing the bag during the initial stages of inflation; and FIG. 4 is a view generally similar to FIG. 3 showing the final stages of bag inflation.

Like parts are indicated by corresponding reference characters throughout the several views of the drawings.

DESCRIPTION OF THE PREFERRED EMBODIMENT

Referring now to the drawings, a device utilizing a gas generator having the inflating and cooling means of this invention is generally indicated at 1. It includes a gas generator 3, a coolant chamber 4 and an inflatable bag 5.

Gas generator 3 may include a main body member 7 having a plurality of cavities or pockets 9 therein. As shown, the confining means or pockets 9 are formed into two groups or sets generally designated 11 and 13. However, the number of groups and pockets may vary considerably without departing from the spirit of this invention.

As shown, each group 11 and 13 includes five pockets with one pocket 15 being designated as the primary ignition pocket for the group and with the other four secondary ignition pockets 9 being arranged around the primary ignition pocket. Propellant confining channels or grooves 17 are provided in body 7 to join each of the pockets 9 in each group of pockets with both the primary ignition pocket 15 and with the next adjacent secondary ignition pocket. In addition, each group of pockets is interconnected to the other group of pockets by propellant confining channels or grooves 19 so that propellant, to be described hereinafter, ignited in one group of pockets may cause ignition of the propellant in all pockets.

Body 7 has recesses or bores 21 and 23 in which ignition devices 25 and 27 are located. The ignition devices may take various forms, such as fuses, ignition squibs, or electrical igniters. As shown, the ignition devices are formed of electrical igniters having extension portions 26 in smaller recesses 28 and two wire electrodes 29 and 31 joined together at the outer ends thereof by a tungsten filament 33.

The electrodes 29 and 31 and filament 33 of each igniter extend into the primary ignition pocket of the respective group of pockets.

Each of the pockets 9 and 15 and the channels 19 are provided with a supply of propellant material 35 adapted, when ignited, to burn rapidly. Many sophisticated or exotic propellants such as rocket propellants are adapted to burn rapidly only when ignited under relatively highly pressurized conditions. Inasmuch as it is not desirable or practical to utilize highly pressurized chambers in devices of the type herein described, such exotic propellants have not proved practical or reliable. However, the well-known propellant, commonly referred to as black powder, will burn and undergo an exothermic reaction very rapidly under relatively low pressures. As is well known, black powder is composed of a mixture of the following materials in approximately the following amounts:

| Potassium Nitrate | 75% |
| Charcoal | 15% |
| Sulfur | 10% |

Generally speaking, the smaller the granule size of the particles the faster the burning rate of the mixture.

While black powder, as described above, will perform in a satisfactory manner to inflate a bag, it has been found that the hydrogen sulfide produced by the reaction of the powder can be eliminated or reduced considerably if the sulfur content of the powder is reduced to the range of zero per cent to a maximum of two percent by weight of the total charge, with a mixture including approximately one-half percent sulfur by weight having been found to be particularly effective, for gas generators for inflatable bag devices. The remaining materials, i.e., the potassium nitrate and charcoal may be changed from the above noted percentages by weight to approximately 70 percent and 28 percent–30 percent, respectively, with approximately 29½ percent by weight charcoal being satisfactory when the sulfur content is approximately ½ percent by weight.

A lower plate 37 is attached to body 7 by fasteners 39 extending upwardly through the plate and the body. Extending across the upper surface of body 7 over all of the propellant filled pockets is a diaphragm 40, such as an aluminum foil diaphragm, for example. A second diaphragm 41, such as a polyethylene diaphragm, for example, overlies diaphragm 40 and underlies an upper plate 42 having holes 43 therethrough vertically aligned with the pockets in body 7. The diaphragms should be adapted to rupture when the pressure within each pocket reaches a relatively low predetermined value, such as, for example, 150 p.s.i. This pressure value of 150 p.s.i. is only exemplary and the rupture pressure value could be higher or lower if desired.

A confining member or ring 45 may be located on top of plate 42 and forms part of a chamber 47 for holding a supply of sublimable, vaporizable or decomposable material 49 capable of absorbing heat. It has been found that two compounds, ammonium oxalate and ammonium formate, are particularly suited for use as solid coolants in gas generating devices for inflatable bag devices. One consideration given to the selection of a proper coolant in this type of device is the pressure producing characteristics of the material when subjected to temperatures of 180° or so. It is possible that such a temperature might be reached in a car parked in the sun on a hot day, for example, It has been found that ammonium oxalate, for example, produces only a few p.s.i. at a temperature of 180° F.

In addition to the use of a coolant it has been found desirable to include a certain amount of oxidizer 49a with the coolant. This oxidizer aids in reducing toxicity and reduces the amount of propellant required to produce a given amount of gas. In particular it has been found that potassium perchlorate has performed well as an oxidizer in a gas generator apparatus for an inflatable bag. The amount of coolant and oxidizer used in a device can, of course, vary depending on many factors, such as, for example, the size of the bag which is to be inflated. However, in a device utilizing approximately twenty grams of propellant, we have found that a 14.5 gram supply of ammonium oxalate and a 3.9 gram supply of potassium perchlorate mixed together and located in chamber 45, provide a component package which results in satisfactory performance. Thus, a complete material package includes about 50 percent propellant by weight, 40 percent coolant by weight and 10 percent oxidizer by weight, the coolant and oxidizer being packaged together.

A third diaphragm 51, such as a polyethylene diaphragm, covers the chamber 47 and is held against ring 45 by a plate 53. Plate 53 has a plurality of holes 55 therein to permit the egress of propellant and material 49.

Bag 5 is folded in a manner to provide a plurality of folds 57 therein located side-by-side and extending generally away from the generator. The outer edge or edges of the bag are folded double and secured to the periphery of the plate 51 by a ring member 59 clamped on the folded edges by fasteners 39. The bag is preferably formed of a flexible woven sheet material combined with a rubber material. As will be made apparent hereinafter, the folding of the bag in the manner substantially permits free expansion of the bag without frictional interlocking of the bag material during initial stages of inflation.

Assuming the bag is in the position shown in FIG. 1, operation of the device of this invention is as follows:

Electrical current is supplied to each of the ignition devices 23 and 25 through the wires connected thereto from a source (not shown) such as an automotive vehicle battery, for example. The current would be supplied in response to a signalling device adapted, for example, to sense an abrupt change in velocity of the vehicle, such as upon impact with another object.

When the current passes through the filaments 33, the powder in each of the primary ignition pockets 15 ignites and begins burning. As used herein, the terms burn or burning mean a reaction which produces or releases gas and heat. A pressure of 150 p.s.i., for example, is rapidly attained, i.e., within a few milliseconds, and this pressure ruptures the diaphragms 40 and 41 over the area of the primary ignition pockets. The powder in the primary ignition pockets which has not burned by the time the diaphragms 40 and 41 rupture, is propelled or thrown, due to the 150 p.s.i. gas in the pockets, first into the chamber 47 where it mixes with the materials 49 and 49a and then through diaphragm 51 into the bag and continues to burn. The material 49 absorbs a significant portion of the heat produced by the burning propellant, both in the chamber 47 and in the bag 5. The material 49a reduces the amount of powder needed to inflate the bag. Moreover, when the material 49 vaporizes, it also releases additional gas for inflating the bag. This initial delivery of gases and burning powder into the bag causes the latter to be thrown into a partially expanded position as generally shown in FIG. 3. Thus, the bag is thrown into this partially expanded position by considerably less than the full force which would be exerted thereon if all of the powder-filled pockets were ignited simultaneously. If the latter condition occurred, two or more of the folds of the bag might be forced together inhibiting bag expansion and resulting in unusually instantaneous pressure which could rupture the bag. The powder may, depending on its burning rate and time of ignition, continue to burn after inflation to maintain the bag in such condition and prevent deflation due to cooling of the gases.

While the bag is being thrown into the partially expanded position, the powder in the channels 17 from each of the primary ignition pockets burns and ignites the powder in pockets 9 surrounding each of the primary pockets. The diaphragm portions covering such remaining pockets are quickly burst and the powder in such other pockets is also thrown through chamber 47 into the bag as the expanding gases expand the bag. The powder thrown into the bag continues to burn to create gas for continuing the inflation of the bag until the latter reaches a desired pressure condition such as shown in FIG. 4. At the same time the material 49 which is mixed with the burning propellant vaporizes and absorbs heat therefrom. As described previously, the absorption of heat causes the material 49 to release gas for inflating the bag and achieving the desired pressure. The oxidizer 49a also mixes with the propellant and reacts to cause more gas to be produced. The ability of the materials 49 and 49a to perform as described permits a reduction in the amount of propellant necessary to achieve the desired pressure in the bag.

If one of the ignition devices 25 should fail to ignite the propellant in the associated pocket 15, the pockets in the associated group of pockets will still be ignited by the propellant in the channels 19 interconnecting the two groups 11 and 13 of pockets.

The total time period between passing current to the ignition devices and complete inflation of the bag is very short, such as 20–30 milliseconds, for example.

In addition to the materials 49 mentioned previously, i.e., ammonium oxalate and ammonium formate, other materials might be useable with the propellant and oxidizer in a gas generating device of an inflatable bag system. For example, it is believed that the following materials might be used in this apparatus with more or less satisfactory results: ammonium carbamate, ammonium acetate, ammonium tartrate, magnesium oxalate, potassium sulfate, potassium bicarbonate, mono ammonium phosphate, zinc oxalate, magnesium phosphate (dibasic), ammonium citrate, ammonium di-citrate, ammonium magnesium phosphate, ammonium magnesium carbonate, ammonium oxalatoferrate, ammonium hydroxy L-malate, cobalt carbonyl, and ammonium zirconyl carbonate. The material 49 should be capable of storage and should be relatively stable. It should produce a fair volume of gas which is not too corrosive and is relatively nontoxic. Most of the materials set forth above have the additional advantages of being storable as a powder.

It is also contemplated that oxidizers other than potassium perchlorate may have application in this apparatus. For example, manganese dioxide, sodium perchlorate, ammonium perchlorate and barium nitrate may be acceptable as oxidizers in this apparatus.

The device may be placed in various locations on the interior of an automotive vehicle, such as on the upper end of the steering column, for example. If a vehicle impact is sensed, the bag can be rapidly inflated to provide a cushion against which a vehicle occupant may be thrown.

As mentioned previously, the device of this invention preferably employs the use of a propellant, such as black powder having a low sulfur content, which is adapted to burn at very rapid rate under relatively low pressures. Moreover, by providing for an initial ignition and burning of some particles of the total propellant, followed by ignition and burning of the remaining particles of propellant, rupturing of the bag may be avoided. Furthermore, the material 49 inhibits or limits the transfer of heat from the propellant gases to the walls of the bag 5.

In view of the foregoing, it will be seen that the several objects and advantages of this invention are achieved.

Although only one embodiment of the invention has been disclosed and described, it is apparent that other embodiments and modifications of the invention are possible within the scope of the appended claims.

We claim:

1. Inflatable device comprising a gas generator and an inflatable bag connected to said gas generator, said gas generator having first confining means for holding a first supply of propellant, a first supply of propellant in said first confining means, ignition means connected to said generator for igniting said first supply of propellant, second confining means for holding a second supply of propellant, a second supply of propellant in said second confining means, third confining means for holding a third supply of propellant, a third supply of propellant in said third confining means, said third confining means interconnecting said first and second confining means, rupturable means covering said first and second confining means normally to prevent the egress of propellant therefrom, fourth confining means over said first, second and third confining means for holding a supply of material capable of absorbing heat, a supply of material capable of absorbing heat in said fourth confining means, said rupturable means covering said first confining means rupturing when the pressure of the gases released by the ignited propellant in said first confining means reaches a predetermined value, the gases released by the ignited propellant in said first confining means inflating said bag to a partially inflated condition, said propellant in said first confining means igniting said propellant in said third confining means which ignites said propellant in said second confining means, the gases released by the ignited propellant in said second and third confining means causing the means covering said second confining means to rupture and causing said bag to be inflated to a desired pressure, said propellant including potassium nitrate and charcoal, the potassium nitrate and charcoal being approximately 98 percent by weight of the total weight of the propellant, said supply of material being forced into said bag by the gases released by said ignited supplies of propellant and absorbing heat from said ignited propellant, said material being selected from the group of compounds consisting of ammonium formate, ammonium acetate, ammonium tartrate, magnesium oxalate, potassium sulfate, potassium bicarbonate, momo ammonium phosphate, zinc oxalate, magnesium phosphate (dibasic), ammonium citrate, ammonium dicitrate, ammonium magnesium phosphate, ammonium magnesium carbonate, ammonium oxalatoferrate, ammonium hydroxy L-malate, cobalt carbonyl and ammonium zirconyl carbonate.

2. Inflatable device comprising a gas generator, an inflatable bag connected to said gas generator, said gas generator having first confining means, propellant in said first confining means, second confining means, propellant in said second confining means, third confining means, propellant in said third confining means, said third confining means interconnecting said first and second confining means, said propellant being adapted to undergo a reaction, said propellant, when reacting, producing heat and releasing gases for inflating said bag, means for causing said propellant in said first confining means to react in response to a signal, the propellant in said first confining means, when reacting, releasing gases to cause the initial deployment and partial inflation of said bag, said propellant in said first confining means causing the propellant in said third confining means to react and release gases, said propellant in said third confining means causing said propellant in said second confining means to react and release gases, the gases released by said reacting propellant in said second and third confining means causing the inflation of said bag to a desired pressure, said propellant including potassium nitrate and charcoal, the potassium nitrate and charcoal being at least approximately 98 percent by weight of the total weight of the propellant, said confining means including means for preventing escape of propellant gases from said first and second confining means into said bag until the pressure of said propellant and gases thereunder reaches a predetermined value, said means for preventing escape of propellant and gases from said first confining means being adapted to rupture and permit escape of said propellant and gases into said bag after said predetermined pressure is reached in said first confining means, and adapted to rupture and permit escape of said propellant from said second confining means after said predetermined pressure is reached in said second confining means and coolant means in said device for mixing with said propellant for preventing some of the heat produced by said propellant undergoing reaction from being transferred to the walls of said bag, said means in said device for mixing with said propellant being a compound selected from the group consisting of ammonium formate, ammonium acetate, ammonium tartrate, magnesium oxalate, potassium sulfate, potassium bicarbonate, mono ammonium phosphate, zinc oxalate, magnesium phosphate (dibasic), ammonium citrate, ammonium dicitrate, ammonium magnesium phosphate, ammonium magnesium carbonate, ammonium oxalatoferrate, ammonium hydroxy L-malate, cobalt carbonyl and ammonium zirconyl carbonate.

3. Inflatable device comprising a gas generator, an inflatable bag connected to said gas generator, said gas generator having confining means, said confining means including first and second separate holding means, passage means interconnecting said holding means with one another, propellant in said holding means and the passage means, rupturable means covering said first and second holding means normally to prevent the egress of propellant therefrom, said propellant being adapted to undergo a reaction, means for causing said propellant in said first holding means to react in response to a signal, said propellant, when reacting, producing heat and releasing gases, said rupturable means covering said first holding means rupturing when the pressure of gases released by said reacting propellant in said first holding means reaches a predetermined value, said gases upon being released from said first holding means initially deploying and partially inflating said bag, said propellant in said first holding means causing the propellant in said passage means to react, said propellant in said passage means causing said propellant in said second holding means to react, said rupturable means covering said second holding means rupturing when the pressure of gases released by said propellant in said second holding means and said passage means reaches a predetermined value, said propellant in said second holding means and said passage means, when reacting, releasing gases to further inflate said bag to a desired pressure, said propellant including potassium nitrate and charcoal, the potassium nitrate and charcoal being at least approximately 98 percent by weight of the total weight of the propellant, means in said device for mixing with said propellant for preventing some of the heat produced by said propellant undergoing reaction from being transferred to the walls of said bag, said means for mixing with said propellant for preventing some of the heat produced by said propellant from being transferred to the walls of said bag being selected from the group consisting of ammonium formate, ammonium acetate, ammonium tartrate, magnesium oxalate, potassium sulfate, potassium bicarbonate, mono ammonium phosphate, zinc oxalate, magnesium phosphate (dibasic), ammonium citrate, ammonium dicitrate, ammonium magnesium phosphate, ammonium magnesium carbonate, ammonium oxalatoferrate, ammonium hydroxy L-malate, cobalt carbonyl and ammonium zirconyl carbonate, and oxidizer material selected from the group consisting of potassium perchlorate, manganese dioxide and sodium perchlorate.

* * * * *